(No Model.)

J. H. & J. E. SMITH.
FERTILIZER DISTRIBUTER.

No. 446,795. Patented Feb. 17, 1891.

Witnesses:
E. P. Ellis,
B. Brockett,

Inventors.
J. H. Smith,
J. E. Smith,
per Lehmann & Pattison,
atty.

UNITED STATES PATENT OFFICE.

JOHN HENRY SMITH AND JAMES EDWARD SMITH, OF BUFORD, ALABAMA.

FERTILIZER-DISTRIBUTER.

SPECIFICATION forming part of Letters Patent No. 446,795, dated February 17, 1891.

Application filed September 5, 1890. Serial No. 363,997. (No model.)

*To all whom it may concern:*

Be it known that we, JOHN HENRY SMITH and JAMES EDWARD SMITH, of Buford, in the county of Etowah and State of Alabama, have invented certain new and useful Improvements in Fertilizer-Distributers; and we do hereby declare the following to be a full, clear, and exact description of the invention, such as will enable others skilled in the art to which it pertains to make and use it, reference being had to the accompanying drawings, which form part of this specification.

Our invention relates to an improvement in fertilizer-distributers; and it consists in the combination of the beam, a hanger secured to the beam, a wheel journaled in the lower end of the hanger and provided with a crank-shaft, and a connecting-rod with the fertilizer-box secured to the beam, a stirring device placed in the box and connected at one end to the connecting-rod, a slide for regulating the discharge from the box, and a lever connected to the slide for operating it, as will be more fully described hereinafter.

The object of our invention is to attach a fertilizer-box directly to the front end of the beam and in advance of the plow, so that as the fertilizer is dropped it will be covered so as to protect it from the rain and sun.

Figure 1:
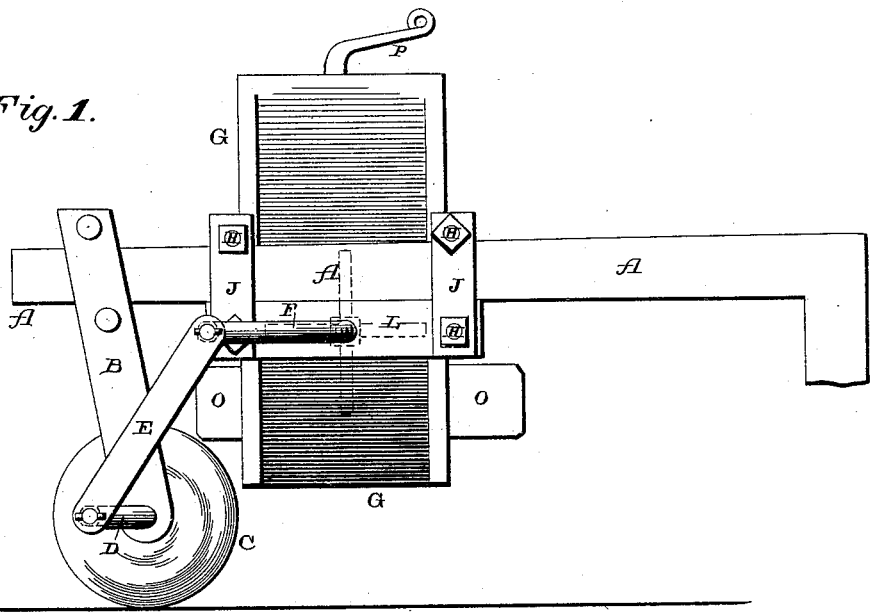
Figure 2:
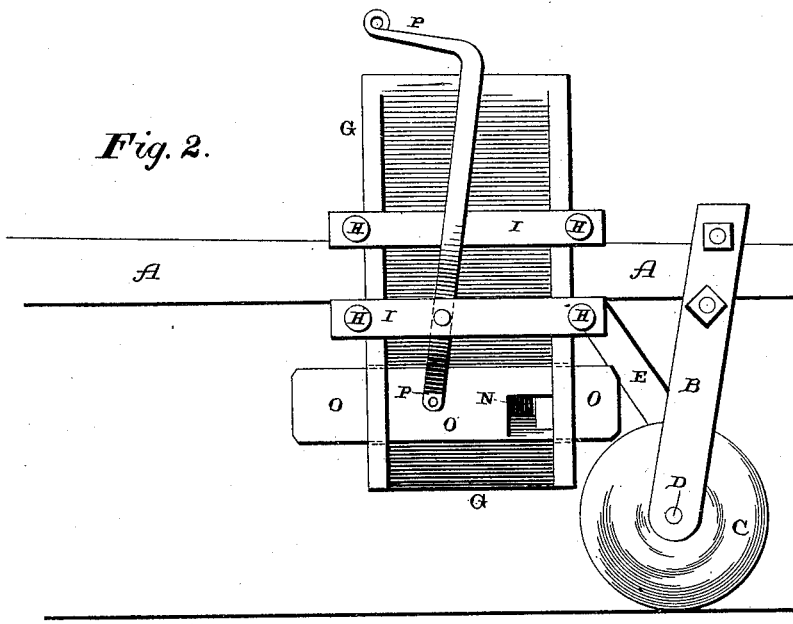

Figures 1 and 2 are side elevations of a machine which embodies our invention.

A represents the beam of an ordinary plow, to the front end of which is secured a hanger B. In the lower end of this hanger is journaled the wheel C, which is provided with a cranked shaft D, which, as the wheel is made to revolve by contact with the earth, operates the connecting-rod E, which is attached at its upper end to the crank end F of an ordinary stirrer-shaft which extends through the box G, in which the guano or other fertilizer is placed. This box G is rigidly clamped to the beam A by means of the bolts H, which extend along the front and rear sides of the box, and which pass through the strips I, applied to the outer side of the box, and through the short vertical strips J and the horizontal strip L, secured against the inner side of the box and just below the lower edge of the beam A. The lower end of the box extends within a short distance of the earth, while the upper end of the box reaches any desired distance above the top of the beam. Through the side of this box at its lower end is formed a suitable opening N, which is controlled by the endwise-moving slide O, which works back and forth through slots formed in the front and rear sides of the box, where their edges project beyond the outer side piece. Pivoted upon one of the strips I is the operating-lever P, which is loosely connected to the slide at its lower end, and which has its upper end turned horizontally backward, so as to have the cord, wire, or chain attached to it for the purpose of enabling the plowman to operate the slide whenever he sees fit, or which can be reached by the plowman's hand if the end is made to extend sufficiently far back. This box containing the fertilizer is secured to the beam in advance of the plow, so that as the fertilizer drops from the box it is covered by the plow, and is thus protected from both sun and rain.

A machine constructed as above described saves the labor of carrying the fertilizer and the expense of one hand. By adjusting the slide the exact amount of fertilizer to be sown is regulated, and it is sown at the same time that the plowing is done. As the plow moves along the wheel causes the stirrer to operate, and thus causes the fertilizer to be distributed.

Having thus described our invention, we claim—

1. In a fertilizer-distributer adapted to be attached to a plow-beam consisting of a standard, a wheel journaled therein having a crank-shaft, the box secured to one side of the beam, a stirrer in the bottom of the box having a shaft extending through one side and provided with a crank, a rod connecting the stirrer-crank and the wheel-crank, the box having an opening in its lower opposite side from the stirrer-crank, a slide for closing the opening, a vertical lever pivoted between its ends above the said slide, the lower end of the lever being connected with the slide, and its upper end extended to be operated, substantially as shown and described.

2. In a fertilizer-distributer adapted to be attached to a plow-beam, the combination of the box having an opening in its lower end, a stirrer having a crank, a standard clamped to the beam at its upper end, a wheel journaled in its lower end having a crank-shaft, a rod connecting the stirrer and the crank-shaft, the horizontal strips I, which engage the outer side of the box, the vertical strips J, which engage the opposite side of the beam, and the bolts which pass through the strips for clamping the box to the beam, substantially as set forth.

3. In a fertilizer-distributer, the combination of the box having an opening in its lower end, a slide which closes the said opening, a standard, a wheel journaled in the lower end of the standard having a crank-shaft, a stirrer in the box having a crank, a rod connecting the stirrer and the crank-shaft, the horizontal strips which engage the outer side of the box, strips at the opposite side of the beam, the bolts which pass through the strips, and a lever pivoted upon one of the horizontal strips, having its lower end connected with the slide and its opposite end extended to operate the slide, substantially as specified.

In testimony whereof we affix our signatures in presence of two witnesses.

JOHN HENRY SMITH.
JAMES EDWARD SMITH.

Witnesses:
PHILIP T. ARCHER,
DANIEL STURKIE.